United States Patent

Shipley

[11] 3,896,949
[45] July 29, 1975

[54] HOISTING AND TOWING DOLLY

[76] Inventor: Michael T. Shipley, 125 N. Riverside Dr., Pompano Beach, Fla. 33062

[22] Filed: Dec. 5, 1973

[21] Appl. No.: 421,803

[52] U.S. Cl. ............................ 214/86 A; 280/402
[51] Int. Cl. ............................................... B60p 3/12
[58] Field of Search ................... 214/86 A; 280/402; 254/189

[56] References Cited
UNITED STATES PATENTS

| | | | |
|---|---|---|---|
| 1,586,417 | 5/1926 | Fojtik | 254/189 |
| 2,854,252 | 9/1958 | McLerran | 254/189 |
| 3,627,154 | 12/1971 | Troup | 214/86 A |
| 3,720,330 | 3/1973 | Forse | 214/86 A |

FOREIGN PATENTS OR APPLICATIONS

| | | | |
|---|---|---|---|
| 13,458 | 10/1955 | Germany | 280/402 |

Primary Examiner—Robert J. Spar
Assistant Examiner—Donald W. Underwood
Attorney, Agent, or Firm—Malin & Haley

[57] ABSTRACT

A vehicle hoisting and towing dolly for towing a disabled vehicle having an improved hoist supporting means which includes an off-set pulley system, the disabled vehicle lifting system comprising a horizontally disposed sling bar connected to a pair of vehicle engaging hoisting slings, the entire sling unit being raised from a central connector with an off-set pulley arrangement. The hoist and disabled vehicle support is mounted on a triangular frame having a pair of larger wheels at the rear of the frame and a guide wheel disposed in front of the frame. The device is attached and towed behind another vehicle with a standard trailer hitch and is utilized for hoisting and towing a disabled vehicle. By providing an off-set pulley lift for the lifting slings as the disabled vehicle is hoisted, the sling bar receives additional mechanical advantage without increasing the complexity of the hoisting mechanism allowing in-line pulley arrangement between the lifting sling pulleys and the support pulleys.

2 Claims, 5 Drawing Figures

3,896,949
PATENTED JUL 29 1975
SHEET 1
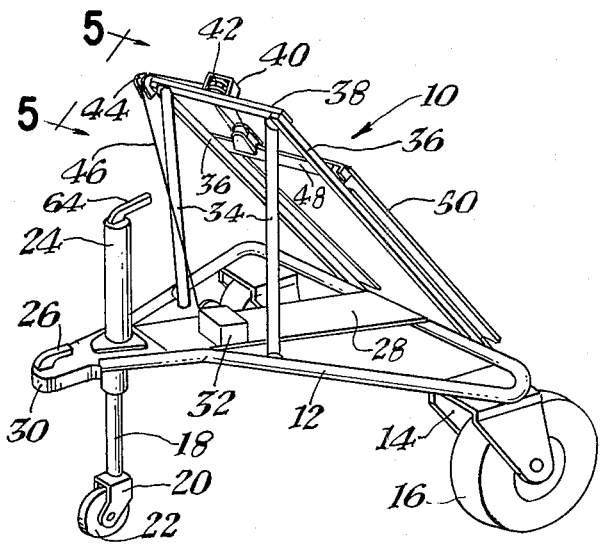
Fig.1.
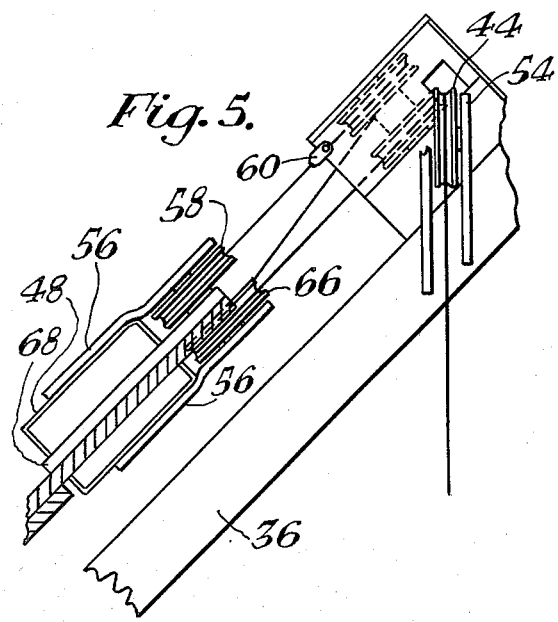
Fig.5.
Fig.2.

HOISTING AND TOWING DOLLY

BACKGROUND OF THE INVENTION

This invention relates generally to a towing dolly which is attached to an automobile or the like and more specifically to a dolly for hoisting and towing a disabled vehicle. With the use of Applicant's device, a large tow truck is not needed, reducing expense to a garage or service station owner.

In the past, several lifting and towing dollies have been shown in the prior art which are very complex in construction and expensive to make. Many of these devices experienced hoist mechanism failures due to heavy loads.

Applicant's invention provides a non-complex solution to this problem in that the lifting slings are hoisted by an off-set pulley mechanism with the sling pulleys and support pulleys in line.

SUMMARY OF THE INVENTION

A vehicle hoisting and towing dolly comprising a frame, a plurality of wheels attached to the frame, a hitching means coupled to one end of said frame, a pair of vertical supports coupled to said frame, a pair of obliquely oriented rails connected to said vertical supports adjacent one end and said frame at the other end, a cross-brace connecting the upper ends of said rails, first pair of pulleys centered and disposed on said cross-brace, a sling bar, a pair of slings, each connected at one end to said sling bar, a cable, a second pair of pulleys connected to the mid-portion of said sling bar, said first and second pulleys aligned in a plane parallel to said rails, said cable connected through said sling pulleys and cross-brace pulleys, a third pulley connected to one of said rails, and said cable, a hoisting means connected to said frame and connected to said cable for moving the cable for lifting a vehicle connected to said slings.

In operation, the standard well-known slings are connected to a disabled vehicle, generally under the front or rear wheels of the disabled vehicle. The hoisting means is actuated, thus raising the slings up the slide rails. The hoisting means may either be hydraulic, electric or by hand. Once the disabled vehicle is hoisted, the sling and sling bar is locked in position on the dolly.

It is an object of this invention to provide an improved hoisting and towing dolly.

It is another object of this invention to provide a hoisting dolly which is non-complex in design.

And still yet another object of this invention is to provide a hoisting and towing dolly having an improved pulley arrangement for increased loading strength.

In accordance with these and other objects which will be apparent hereinafter, the instant invention will now be described with particular reference to the accompanying drawings.

BRIEF DESCRIPTION OF THE DRAWINGS

FIG. 1 shows a perspective view of Applicant's invention.

FIG. 2 shows a top, plan view of Applicant's invention.

FIG. 5 shows a cross-sectional view taken along line 5—5 of FIG. 1 of the pulley mechanism utilized in Applicant's invention.

PREFERRED EMBODIMENT OF THE INVENTION

Figure 3:
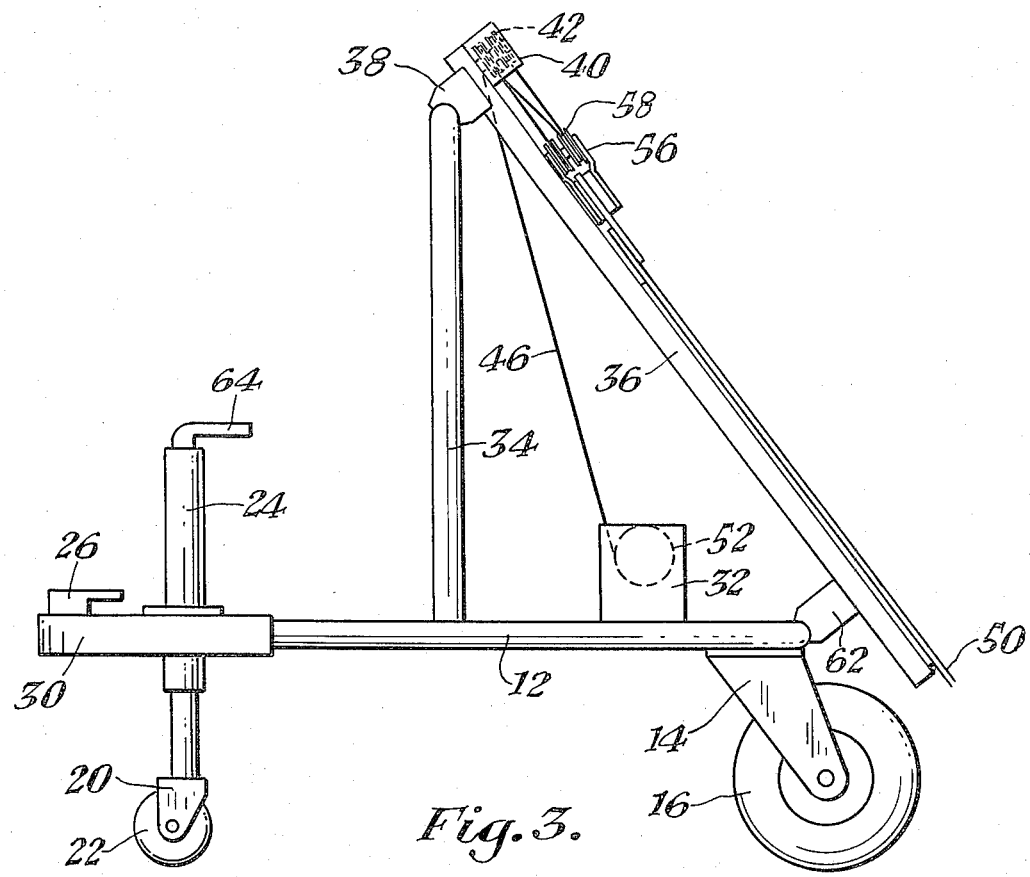
FIG. 3 shows a side, elevation view of Applicant's invention.

Referring now to the drawings and especially FIG. 1, Applicant's hoisting and towing dolly 10 is shown comprising a triangular supporting frame 12 which may be a hollow tube having a pair of wheels 16 suspended by a wheel housing 14 which is connected to the frame and may be pivotally attached thereto. A front guide wheel 22 whose vertical position may be adjusted by crank mechanism 24 is connected to the apex plate 30 connected to the forward section of the frame 12. A standard trailer hitch connection means 26 is coupled to apex plate 30. A supporting plate 28 is connected between the forward and rear portions of the frame 12. A pair of vertical support arms 34 are connected to obliquely disposed sling guide rails 36 at their upper ends and to the frame 12 at the lower ends. A supporting cross-brace 38 is connected between the rails 36. Centrally attached on the upper surface of cross-brace 38 is a pulley housing 40 housing a first pair of pulleys 42.

FIG. 2 shows the sling system comprising a pair of disabled vehicle attaching lifting slings 50 attached to a sling support cross-bar 48. The sling cross-bar 48 is movably connected to guide rails 36 and moves longitudinal thereof. The sling cross-bar 48 has a pulley housing 56 centrally connected thereto and housing a pair of pulleys 58, disposed in the same plane as pulleys 42.

FIG. 3 shows Applicant's dolly with motor 32 which may be electrical or hydraulical having a cable reel 52 which houses the cable 46. The cable 46 is disposed through pulleys 42 and pulleys 58 which pairs of pulleys are aligned in the same plane to provide increased mechanical advantage for lifting slings 50 which may be coupled to a disabled vehicle.

The pulley housing 56 is connected to the sling cross-brace 48 (FIG. 4) while the upper portion of the slings are attached to the guide rails 36. The guide rails act as a track for the upper portion of the slings 68 and allow sling movement along the guide rails while raising or lowering a vehicle attached to the sling 50.

FIG. 5 shows deployment of a vertically oriented pulley 44 which is connected on one side of Applicant's device to either guide rail 36 by pulley housing 54. This allows for the change of direction of the cable from the lower pulley on cross-brace 38 to the cable reel 52. The cable 64 is terminated and connected to the cross-brace by cable connector 60. By energizing the motor 32, the slings may be pulled up the guide rails with an increased mechanical advantage with the double paired pulleys. The pair of pulleys that are attached to the cross-bar support arm have axes that are perpendicular to the plane of the guide rails.

Figure 4:
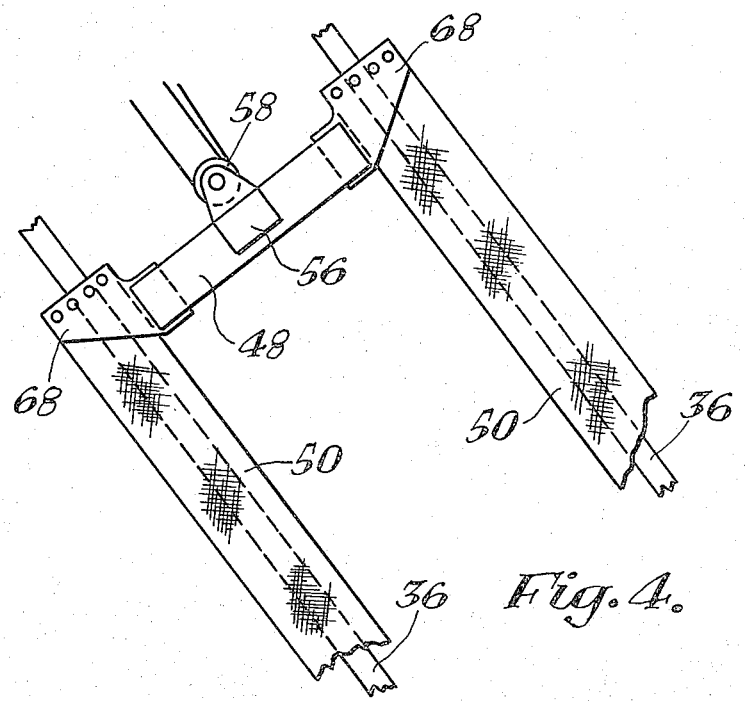
FIG. 4 shows a top, plan view of the sling system utilized for hoisting in Applicant's invention.

FIG. 4 shows the attachement of the slings 50 to the sling cross-bar 48 by a pair of sling plates 68 which are also connected on their bottom side slidably to the guide rails 36.

In operation, Applicant's dolly is connected to a vehicle, such as an automobile, and is towed to a desired location. A disabled vehicle may then be coupled to the dolly with a standard vehicle connector (not shown) at the free end of the slings 50. The motor 32 is then actuated which lifts the front or rear end of the disabled vehicle until it is raised sufficiently above the ground to be towed properly. Once the disabled vehicle is in the towing position, additional chains or the like may be utilized to lock the sling mechanism in a fixed position relative to the upper vertical support.

By utilizing Applicant's dual pulley arrangement with the pulleys lying in a plane parallel to the plane of the guide rails, increased mechanical advantage is achieved with structural simplifications which allow the lifting pulleys to be engaged to both the lifting sling and the cross-bars while remaining in line.

The instant invention has been shown and described herein in what is considered to be the most preferred and practical embodiment. It is recognized, however, that departures may be made therefrom within the scope of the invention and that obvious modifications will occur to a person skilled in the art.

What I claim is:

1. A hoisting and towing dolly comprising:

a frame;

a plurality of wheels coupled to said frame for supporting said frame in a substantially horizontal position;

a pair of vertical support members connected to said frame;

a pair of inclined guide rails connected at their upper ends to respective vertical support members and at the lower ends to the frame;

a cross-brace connected between the upper ends of said vertical support members;

a first pair of pulleys connected substantially centrally to said cross-brace and lying in a plane parallel to the inclined guide rails;

a pair of flexible sling members moveably connected to said guide rails;

a sling cross-bar connecting said flexible sling members together at one end;

a second pair of pulleys disposed centrally of and connected to said sling cross-bar, said second pair of pulleys lying in the same plane as said first pair of pulleys and substantially in line therewith;

a cable disposed through said first pair of pulleys and said second pair of pulleys and connected at one end to said vertical support cross-bar;

means connected to said frame for moving said cable, said cable connected at its other free end to said cable moving means;

a vehicle connecting means disposed at one end of said frame; and a third pulley connected to one of said guide rails, said cable engageable through said pulley, the plane of said third pulley lying in a substantially vertical plane relative to the frame.

2. A dolly, as in claim 1, wherein:

the diametrial plane of said first pair of pulleys and said second pair of pulleys is parallel to the plane of said guide rails.

* * * * *